United States Patent Office 3,509,874
Patented May 5, 1970

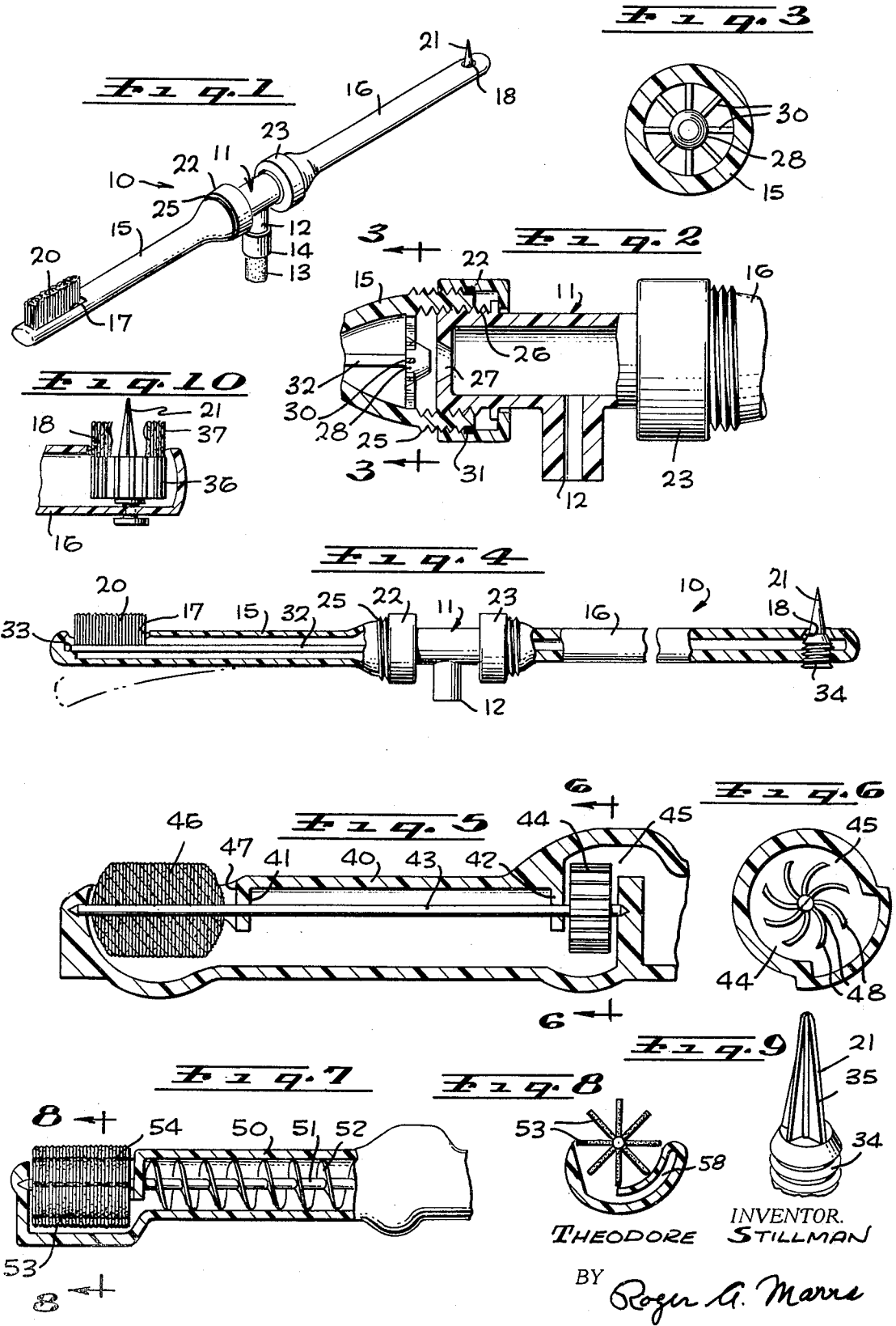

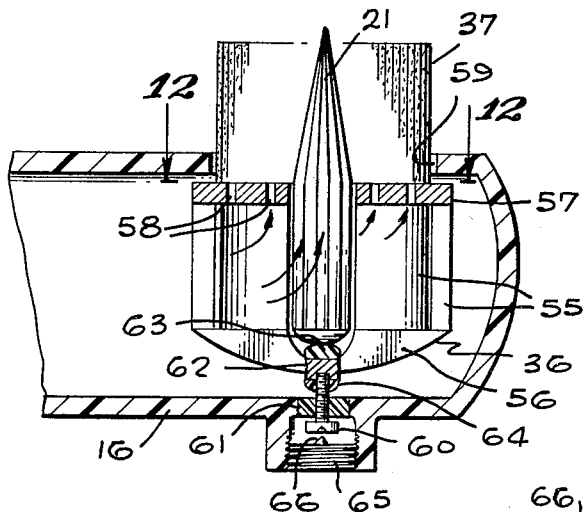

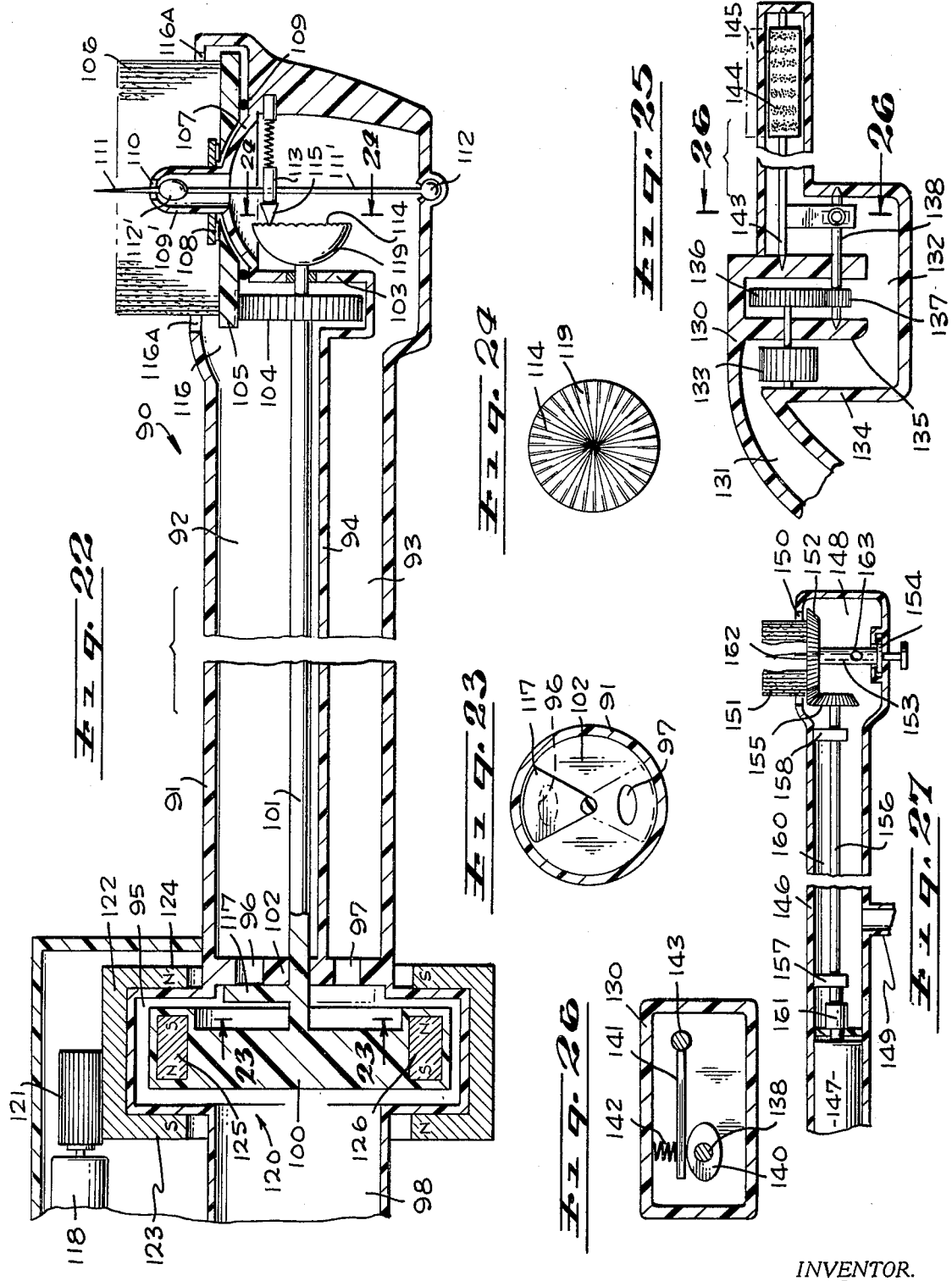

3,509,874
DENTAL CLEANSING AND MASSAGING APPARATUS
Theodore Stillman, 5927 Stafford,
Huntington Park, Calif. 90255
Continuation-in-part of application Ser. No. 584,321,
Sept. 23, 1966. This application Sept. 27, 1967, Ser.
No. 670,932
Int. Cl. A61h 13/00
U.S. Cl. 128—66   18 Claims

ABSTRACT OF THE DISCLOSURE

A hydraulically actuated oral hygienic device wherein pressurized fluid is utilized to drive teeth cleaning and/or gingival massaging means. Conduits within the device are selectively placed in fluid communication with a remote source of fluid via a control valve. Fluid passing through the conduit bears against driving means disposed therein which are coupled to a brush or gum massager causing oscillatory or rotational movement thereof. Mechanisms are included for causing oscillation of the water pressure and for placing the picks, massagers, and brushes within streams of water that have oscillating pressures. The fluid is thereupon expelled through apertures located adjacent the brush or gum massager so as to cause food debris to be effectively flushed away.

RELATED APPLICATIONS

This application is a continuation-in-part of my copending application entitled, "Water Needle Tooth Cleansing and Gum Treatment Implement," filed Sept. 23, 1966, and having Ser. No. 584,321.

BACKGROUND OF THE INVENTION

Field of the invention

This invention relates to an apparatus for the promotion of oral hygiene, and more particularly, to an improved hydraulically actuated tooth brush and gingival massager for effecting the removal of food particles from between the teeth which is adapted for the massage of the gums.

Description of the prior art

The therapy in common chronic periodontal disease constitutes one of the main problems in dentistry, and one that is far from being satisfactorily resolved. Since food left between the teeth and under the gums is generally considered a major cause of tooth decay and pyorrhea, many dentists are presently advocating the usage of dental massage as a prophylactic measure against decay and disease.

Medical science has demonstrated in the past that a thorough cleansing of teeth and gums greatly assists in protecting and promoting human health and comfort. Where trapped debris and microorganisms (and their metabolic products) are removed fromthe cervical surfaces of the teeth next to gum margins, calculus accumulation or tartar is prevented since the inorganic salts necessary for producing such accumulation will deposit and calcify only when the organic matrix of this deposit is present. When this removal process is accomplished by a fluid stream or vibrating brush, the inherent cyclic pressure and relaxation results in increased circulation in the underlying tissues thereby promoting healthier gums.

While in ancient times, the finger had to serve as the means of cleaning the teeth and massaging the gums or gingiva, the introduction of the tooth brush enhanced the possibility of doing it more effectively, in that the bristles of the brush penetrated to some extent between the teeth.

The conventional toothbrush, however, unlike the present invention, is associated with considerable potential injury to the soft tissue and very often cannot act to massage the epithelium between the teeth. Thus, however important the toothbrush may be in promoting oral hygiene, its usefulness in gingival massage is inherently limited.

While it is true that many overzealous toothbrush users brush too long in one or two areas and may even remove the surface epithelium, most toothbrushes users do not brush long enough and do not effectively flush their mouths to remove all the oral debris.

As a result, oral hydrotherapeutic syringes have been proposed because of their great assistance and value for loosening and flushing away debris adhering to and/or trapped between teeth. The utlization of syringes has, however, been severely curtailed because of the requirement of utilizing them in conjunction with a toothbrush and not as a replacement therefor. Their acceptance has also been impeded by their complexity, costliness and the fact that they have been difficult to use and control.

Thus, while numerous devices for promoting oral hygiene have been proposed in the past, these have generally fallen short of the accomplishment of the desired ends in various aspects. Many, for example, have been designed to become permanently affixed to the fluid source which, in the case of a home water faucet, necessarily interferes with the normal operation and utilization thereof.

SUMMARY OF THE INVENTION

The problems and difficulties encountered with conventional dental brushing and syringe devices for the promotion of oral hygiene are obviated by the present invention. In one embodiment thereof, a novel brushing means and gingival massager is provided having a T member formed with an input port and a pair of output ports which are all in fluid communication. The input port is coupled to a source of pressurized water via an elongated hose which is releasably connected to the source of a clamping means. An apertured body member is carried at each of the T member at each of the output ports so that the body members cantilever outwardly therefrom. The apertures in each body member are in fluid communication with the T member ports and a selected one of the apertures is adapted to receive a tooth brush so that the bristles thereof outwardly project exteriorly of the body member while the other aperture is adapted to mount a flexible pick so as to extend beyond the periphery of the second body member. Each is of sufficient size to accommodate passage of the water therethrough to perform a thorough flushing action. Control means are provided for selectively supplying water to either the brush or the pick depending upon the requirements of the user.

Other embodiments of the present invention provide for rotary brush means including water turbine driving means and rotary soft pad mens effective for gum massage. Also, a variety of picks are included such as may be formed from one end of a plastic hose which operate on the Bernoulli principle for control of the water discharge about the pick during use. Still other embodiments are included witht he concept of the present invention for combining a rotary brush with a pick about which the water discharge is employed for flushing procedures and means for vibrating the pick to gain more effective dislodgement of undesired food particles and means for fluctuating the water pressure. In these latter embodiments, power driving means may be connected to the rotary brush or pad by a magnetic coupling so that positive driving action is provided which may be placed in the water conduit.

Therefore, it is a primary object of the present invention to provide a novel oral syringe for introducing a therapeutic fluid discharge into the mouth of the user under pressure for cleaning the teeth and massaging the gums.

Another object of the present invention is to provide a novel dental apparatus incorporating provision for removably carrying a toothbrush about which a water discharge is directed to not only effect brushing of the teeth but to create a flushing environment as well.

Another object of the present invention is to provide a novel combination toothpick and brushing apparatus including a rotary brush encircling a vibratory pick which is power driven.

Still another object of the present invention is to provide a novel water turbine driven brush assembly adapted to brush the teeth of a user and simultaneously flush away oral debris.

A further object of the invention resides in the provision of a water pick fabricated from a plastic hose or mounted on the end of a hose which is inexpensive and highly effective to remove undesired particles from between the teeth of a user.

Still a further object of the present invention is to provide a novel oral cleaning and massaging device having means for conveniently connecting the device to a conventional water faucet (or to any other source of pressurized water) so as to employ the main discharge stream therefrom for oral hygienic purposes.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

FIG. 1 is a perspective view of one embodiment of the novel dental cleaning apparatus of the present invention incorporating a conventional toothbrush and a toothpick;

FIG. 2 is an enlarged fragmentary view, partly in section, of a valve means interconnecting the body members of the apparatus shown in FIG. 1;

FIG. 3 is a cross-sectional view of the apparatus as taken in the direction of arrows 3—3 of FIG. 2;

FIG. 4 is a sectional view of the apparatus shown in FIG. 1 illustrating the outwardly projecting body members carrying the brush and pick respectively;

FIG. 5 is an enlarged sectional view of another embodiment including rotating bristles driven by a water turbine;

FIG. 6 is a cross-sectional view of the device illustrated in FIG. 5 as taken in the direction of arrows 6—6 thereof;

FIG. 7 is a sectional view of still another embodiment showing a spiral water-driven shaft for rotating a plurality of bristles;

FIG. 8 is a cross-sectional view of the device shown in FIG. 7 as taken in the direction of arrows 8—8 thereof;

FIG. 9 is an enlarged perspective view of a pick employed in the device of FIG. 1 modified to the extent of including a fluted shank;

FIG. 10 is a sectional view of the device shown in FIG. 1 illustrating the provision of a circular brush carried on a water turbine mounted so as to encircle the pick;

FIG. 11 is an enlarged fragmentary view, in section, of a water turbine for driving a pick suitable for incorporation into the body member for holding the pick as shown in FIG. 1;

FIG. 12 is a sectional view of a water turbine for rotating a pick as taken in the direction of arrows 12—12 of FIG. 11;

FIG. 13 is a side elevational view of another embodiment of the present invention illustrating a novel coupling means for joining an oral syringe to a conventional water faucet;

FIG. 14 is a cross sectional view of the coupling means shown in FIG. 13 as taken in the direction of arrows 14—14 thereof;

FIG. 15 is an elevational view of a portion of the coupling means as taken in the direction of arrows 15—15 of FIG. 14;

FIGS. 16–21 are enlarged sectional views of various discharge exits suitable for use in connection with the oral syringe of FIG. 13;

FIG. 22 is a longitudinal sectional view of a combined vibrating pick and rotary brush assembly adapted to be powered via a magnetic coupling;

FIG. 24 is an enlarged view of vibrating mechanism employed in the embodiment shown in FIG. 22;

FIG. 23 is a sectional view of a port blocking mechanism effective to produce a pulsating discharge stream;

FIG. 25 is a longitudinal view of a powered vibrating toothbrush; and

FIGS. 26–27 are views of other embodiments of the present invention.

DESCRIPTION OF THE PREFERRED EMBODIMENTS

Referring to FIG. 1, the novel dental apparatus of the present invention is shown in the general direction of arrow 10 which comprises a T member 11 having an input port 12 coupled to a hose 13 via a sliding nipple 14. The opposite end of the hose 13 is suitably connected to a conventional water faucet located at a sink or basin or to any source of pressurized water. The T member 11 is provided with a pair of output ports 27, in fluid communication with the input port, which are situated on opposite sides of the T member 11. Each of the output ports is in fluid communication with a hollow body member, such as is represented by numerals 15 and 16, respectively. The body members 15 and 16 are cantilevered outwardly from the T member 11 and include an elongated aperture 17 located in the end of body member 15 and a circular aperture 18 located in the extreme end of body member 16. The elongated aperture 17 is employed to accommodate the insertion of a conventional toothbrush so that a plurality of bristles 20 will outwardly project therefrom with sufficient spacing or gap to provide a controlled discharge of water therethrough. The aperture 18 is employed to accommodate passage of a pick 21 so that the shank of the pick extends outwardly from body member 16 in alignment with the bristles 20 and projecting from the same side of the device as the bristles.

The major length of the body members, as well as the T member, may be readily grasped in the hand of the user and the desired brush 20 or pick 21 may be inserted into the user's mouth for performing cleaning and massaging procedures of the teeth and gums. The user may selectively regulate the flow of water through either body member 15 or 16 by valve means constituting rotatable collar 22 associated with body member 15 and collar 23 associated with body member 16.

As shown more clearly in FIG. 2, the control valve associated with body member 15 is illustrated in section so that it can be seen that the members 15 or 16 can be rotated selectively into sealing or blocking engagement with the output port of T member 11 to terminate flow therebetween. The collars 22 and 23 are sealably carried on each branch of the T member 11 and is in threadable engagement with the ends of body member via threads 25. The body member 15 further includes a threaded connection with the output port branch of the T member via threaded arrangement 26 so that the body member is cantilevered therefrom. The output port of the T member associated with body member 15 is indicated by numeral 27 and is preferably tapered not only to control the discharge of the water therefrom into the hollow of body member 15 but to seat a tapered element 28 operable to terminate the flow of water therethrough when a selected member 15 or 16 has been rotated to effect the blocking of water therethrough. The element 28 is mounted immediately behind the threaded connection 26 and is carried coaxially of the output port 27 by means of a plurality of spokes represented by numeral 30 and as more clearly shown in FIG. 3. Because of the unusual high water pressure encountered in conventional household water systems, it is preferred that an elastomeric annular seal 31 be provided to prevent the inadvertent discharge of water between the threads of collar 22 and the outer threads 25 carried on the body member. Also, it is to be understood that the control valve associated with body member 16 is identical to the valve means immediately described.

Referring now in detail in FIG. 4, it can be seen that the body members 15 and 16 are preferably composed of a resilient plastic-like material. The bristles 20 are secured on the end of a handle 32 which constitutes a conventional toothbrush. The handle 32 has its end opposite to its end carrying bristles 20 suitably secured to the body member 15 such as by an interference fit in a mating receptacle. The end of handle 32 immediately beneath the bristles 20 is seated on a shoulder 33 within the hollow of body member 15. To insert or remove the handle 32 from the body member, the body member may be flexed downwardly about its connection with T member 11 into the position shown by broken lines. At this time, the extreme end of handle 32 which was seated on shoulder 33 will be exposed through the aperture 17 and the toothbrush may be manually grasped and withdrawn from the body member. Another toothbrush may be insertably received within the body member by again bending the body member downwardly and inserting the handle 32 through the aperture 17 and then being followed by permitting the resilient body member to assume its position shown in solid lines whereby the bristles 20 will project through the apertures 17.

With reference to the body member 16, it can be seen that the shank 21 of a pick is projected through the aperture 18. Preferably, the pick includes a threaded connection 34 which permits the pick to be removed from the body member 16 when desired. The pick may include a tapered and smoothly contoured shank 21 as shown in FIG. 4, or the pick may be configured with a plurality of flutes such as is indicated by numeral 35 in FIG. 9. The provision of flutes 35 will tend to direct and control the water discharge via aperture 18. Preferably, the shank 21 of the pick is coated with a frictionless plastic-like material such as Teflon, for example. By providing such a coating, the pick will not become injurious to the gums of the user and, in some instances, may be employed to massage or revitalize gum tissue.

If desired, the shank of the pick 21 may be employed to mount a rotatable water turbine 36, as shown in FIG. 10, having its central axis of rotation coaxial with the shank 21. The turbine includes a plurality of vanes which are in interfering relationship with the water passing through the hollow of body member 16. A plurality of bristles 37 may be suitably affixed to one side of the water turbine 36 so as to project through the enlarged aperture 18 exteriorly of the body member 16. However, it is to be noted that the terminating ends of the bristles 37 are immediately beneath the terminating end of the pick shank 21. By this construction, the user benefits not only from the picking action but the rotary action of the bristles 37.

It is to be kept in mind that the water supplied via the input port 14 of the T member is selectively distributed to the hollow of either body member 15 or 16 dependent upon the position of the elements 28 of members 15 and 16 with respect to associated ports 27, depending on the position of 28 relative to 27 or depending on which opening from the T member is open. In either event, the water will be discharged through the body member's respective aperture so that the user's mouth is substantially irrigated and the discharge of the water via the apertures is extremely conducive to the cleansing or massaging action in combination with either the bristles 20 or the pick shank 21.

Referring now in detail to FIG. 5, another embodiment is shown wherein a body member 40 is provided having a hollow interior into which elements 41 and 42 project in order to rotatably mount a drive shaft 43. One end of the drive shaft 43 fixedly carries a water turbine 44 within an enlarged chamber 45 formed on one end of the body member 40. The water turbine 44 is in a conduit including chamber 45 so that water introduced into the interior of the body member 40 will impinge against the vanes of the turbine to cause rotation of the drive shaft 43. Located on the opposite end of the drive shaft from its end carrying the water turbine, there is provided a plurality of bristles 46 which project through an enlarged opening 47 so as to be exposed exteriorly of the body member 40. If desired, the bristles may be replaced with a resilient and spongy material in the form of a ball that may be employed as a pad for massaging the gums of the user. In either event, the introduction of water into the hollow portion of the body member 40 will cause the water turbine 44 to rotate and rotatably drive shaft 43 so that rotary movement of the bristles 46 will be achieved. Sufficient space is provided between the bristles (or pad) and the body member 40 to permit a sufficient quantity of water to pass therethrough for flushing and irrigating purposes.

Referring to FIG. 6, it can be seen that the turbine 44 includes a plurality of curved vanes 48 which are so directed so as to be impinged by the introduction of water into chamber 45 so that rotation of the shaft 43 will be initiated and maintained.

With reference to the embodiment shown in FIGS. 7 and 8, a body member 50 is illustrated for supporting a drive shaft 51 on which is mounted a spiral vane assists in the rotation of the drive shaft 51. Such a spiral vane could be the only source of propulsion because the spiral vane is propelled by the water passing through hollow body 50 as the water impinges on the vanes and creates pressure which is transferred into rotational motion due to the angle of the vane relative to the direction of water. Securely affixed to the end of the shaft 51, there is provided a plurality of bristles 53 forming a rotary brush wherein the bristles project exteriorly of the body member 50 via an elongated aperture 54. The bristles 53 are arranged in parallel rows radiating outwardly from the central shaft so as to form straight vanes. The water discharging from slot 58 impinges on the vanes of bristles, thereby assisting in the rotation of the total brush. As in the instance described with respect to FIG. 5, the bristles 53 may be of relatively rigid construction so as to provide brushing action to scrub the user's teeth clean or, the bristles 53 may be relatively soft and resilient so as to provide massaging action against the gums of the user's mouth.

It is to be understod that the concept of the present invention provides that the dental apparatus 10 may include the embodiments shown in FIGS. 1–10 in combination or individually by either mounting the various embodiments independent of one another or in combination by a member such as T member 11.

Referring now to FIGS. 11 and 12, additional details of the rotary brush and pick combination shown in FIG. 10 are illustrated. The rotary turbine 36 includes a plurality of curved vanes 55 which are mounted between a base 56 and an apertured plate 57. As water flows between the vanes as indicated into the direction of the arrows, the force of the water is passed through apertures 58 and then through the enlarged circular aperture 18 in the body member 50. A bolt 60 rotates in a bearing 61 while the turbine 36 rotates on a bearing 62 movably captured between a pair of curved washers 63 and 64. The base of pick shank 21 is secured to the bolt 60. Since bolt 60 can freely rotate in bearing 61, the pick shank is free to also rotate. A cap 65 is employed to apply pressure on bolt 60 by forcing a point 66 against the head of bolt 60 and thereby providing an adjustment for controlling the speed of rotation of the pick 21. The water impinges against vanes 55 and exists through the apertures 58 in plate 57 and also through the central aperture 59 in plate 57. The pick shank 21 extends through aperture 59 so that water discharging through central aperture 59 impinges on the vanes or flutes of the pick and assists in causing rotation of the pick. As the water turbine 36 rotates, streams of water issue from apertures of plate 57. The rotating pressurized moving streams of water provide a pulsating pressure that is stimulating to the gums.

Referring now in detail to FIG. 13, another embodiment of the present invention is shown as indicated in the general direction of arrow 65 which includes an oral syringe 69 connected on one end to a flexible hose 67 which, in turn, is carried on the end of a coupling means indicated by the arrow 68. The coupling means 68 is releasably fastened to a conventional water faucet 70 by means of a clamp 71 via rotatable handle 72. The coupling means 68 includes an inner tube or hose 69 made of rubber having a flexible band clamp 74 fitted over the rubber hose. Tightening the clamp 71 fastens the hose on the faucet (or other source of pressurized water). An outer rippled casing 73 surrounds inner hose and contains the water pressure. Without this casing, the inner rubber hose may rupture because of the very high pressures delivered by the water faucet. The handle 72 extends through the outer casing. The handle may also be a knob or any means of facilitating the tightening of clamp 71 by hand and without the use of tools. As can be seen from the FIGS. 13–15, the clamping means includes a plurality of notches 75 formed in the flexible band 74 which are engaged by the threads 76 formed on the shank of a member extending from the handle 72. Therefore, as the handle 72 is manually rotated, the threaded connection between the handle member and the notches 75 will cause the band 74 to constrict about the inner hose to engage the inner hose with the faucet 70. However, it is to be noted that for some conventional water faucets, it is desirable to employ an adapter 77 which is threadably secured at one end to the water faucet 70 and adapted to detachably receive the coupler 68 on its other end.

In FIG. 16, the oral syringe 66 is illustrated as terminating in a discharge end which is tapered from the major length of the syringe and slightly curved so as to discharge a fluid stream therefrom substantially perpendicular to the major length of the syringe, and to increase the water pressure due to Bernoulli principle. The syringe 66 may include a pick portion 80 which projects through the orifice 81 employed to discharge the fluid from the syringe, or the pick may be the point produced when the tube is cut at an angle, thus producing a beveled tip as illustrated in FIG. 16a. The beveled tip becomes practical when a steel needle is used. Thus, an ordinary syringe needle can be used as a pick provided it is properly coated with a suitable plastic or rubber to protect the teeth and gums. The pick portion 80 can be secured at one end to the inside bore of the syringe 66 immediately adjacent to the discharge orifice 81. Therefore, it can be seen that fluid flowing in the direction of the arrows through the orifice 81 will assist in flushing and irrigating the user's mouth as the pick portion 80 is employed to dislodge undesired particles from between the user's teeth. Preferably, the syringe is composed of a plastic material and the arcuate portion indicated by numeral 82 may be formed by heating the end of the syringe and bending the end to the curved configuration as shown. At the same time, the pick portion 80 may be either adhesively secured to the inside wall of the curved portion 82 or during the heating of the plastic material, sufficient adhesion may occur so as to securely affix the pick portion thereto or the pick may be a part of the wall formed by simply cutting a tapered hole in the end of the pick.

With respect to FIGS. 17 and 20, another version of an oral syringe is illustrated in which a pick portion 83 is a wire or length of metal which can be covered with a Teflon or other plastic-like coating 84. In FIGS. 18 and 21, the syringe 66 terminates at orifice 81 with a plastic tubular pick 85 which is plastic coated so as to prevent damage or irritation to the gums of the user. The tube 85 adds to the flushing and irrigating capabilities of the device inasmuch as the main discharge or carrier stream from the syringe 66 will be through orifice 81 while a portion of the stream will be directed through the tube 85 for discharge through an orifice 86. The pick portion 85 may be a plastic tube or it may be a metal tube which is resiliently coated with a protective material. Referring now to FIG. 18a, the pick portion includes a looped element 87 which is outwardly cantilevered from its securement with the discharge orifice 88 of the oral syringe 66. Such a loop is highly advantageous in effecting the dislodgment of particles from between the teeth of the user as the loop is less likely to cause injury to the gums because it is not sharp pointed and because it is flexible. The loop can be readily shaped and can be coated with rubber and can be made from steel or plastic or any other material.

Referring now in detail to FIGS. 22–24 inclusive, another embodiment of the present invention is shown and is indicated in the general direction of arrow 90 which includes a body member 91 that is formed with a pair of fluid conduits 92 and 93 as separated by inner partition 94. Body member 91 includes a transmission chamber 95 which is in fluid communication with conduit 92 via port 96 and conduit 93 via port 97. Chamber 95 is also communicated with an input chamber 98 which is suitably connected to a source of pressurized water (not shown). Within the transmission chamber 95, there is provided a rotating member 100 which may be a water turbine, spiral gear or the like which is coupled to an elongated shaft 101 mounted on one end between ports 96 and 97 on a vertical wall 102. The other end of shaft 101 is rotatably carried on a partition 103 which forms the terminating end of partition 94 separating the pair of conduits. Shaft 101 rotates within conduit 92 and includes a ring gear 104 which is in driving mesh with a rotatable member 105. Outwardly projecting from the side of member 105 opposite to its side in mesh with gear 104, there is provided a plurality of bristles 106 which are rotatably driven by the shaft 101. Defined between the terminating end of the external wall of body 91 and the rotating brush 106, there is provided an aperture 116.

Member 105 is adapted to rotate about a semicircular member 107 on a plurality of bearings 108 and 109. An upright mounting member 109′ is disposed through the central opening of base 105 so as to permit the base member to rotate thereabout. The extreme end of member 109′ is provided with an aperture 110 through which a pick 111 extends. Pick 111 is on the end of a shank 111′ by a coupler 112′ which is secured at its opposite end to an immobile fitting arrangement 112 formed in the side wall of housing 91. The pick is adapted to move in a vibratory fashion by means of a spring biased cam follower 113 which follows the motion of a rotary element 119 having an irregular cam surface 114 against which a cam follower tip 115 rides. The element 119 is mounted on the extreme end of shaft 101 and rotates accordingly, so that as the cam follower 113 moves in an oscillatory action back and forth flexing about the fitting arrangement 112, the extreme opposite end of the pick 111 will vibrate back and forth accordingly.

The pick 111 is composed of rubber or other resilient material so that the gums or teeth are not damaged by the vibratory movement of the pick. Also, the pick 111 may be readily removed from its interference-type securement with coupler 112'. The pick may be employed without the fluid irrigation supplied via conduits 92 and 93 or the fluid irrigation may be provided, if desired. The vibratory effects of the pick function to stimulate the user's gums which is an important feature of the present invention.

The rotary brush 106 is projected through an aperture 116 which is asociated with conduit 92 so that water entering the conduit from port 96 is discharged through the aperture 116 about the bristles of brush 106. On the other hand, aperture 110 associated with the vibrating pick is in fluid communication with chamber 93 so that water entering through port 97 is directed for discharge about the free end of pick 111.

The water flowing through conduits 92 and 93 may be caused to pulsate by means of a single vane 117 carried on shaft 101 within chamber 95. The vane 117 alternately opens and closes the ports 96 and 97. When the vane closes a selected port, this action interrupts the flow of water into the conduit; however, when the vane is rotated to unblock the port, water is introduced into the conduit. In this fashion, both the water discharge issuing apertures 116 and 110 may be pulsated which results in beneficial action against the gums of the user as well as to aid in dislodging food particles from between the teeth. By this construction, the pulsating fluid discharge, vibrator pick 111 and rotating brushes 106, provide beneficial results either individually or in combination which are not achieved through the use of ordinary and conventional brushing or mouth irrigating devices.

The shaft 101 is rotated by means of an electric motor 118 via a magnetic clutch. Motor 118 is connected to the drive shaft 101 by means of a magnetic coupling unit indicated in the direction of arrow 120 part of which is carried on the member 100 connected to the shaft 101. The motor 118 drives a pinion gear 121 which is in mesh with a ring gear 122 which is in the form of a magnet having opposite poles 123 and 124. The member 100 of the magnetic coupling means includes bar magnets about its periphery such as is represented by permanent magnets 125 and 126, respectively. However, it is to be understood that other propulsion or shaft driving arrangements may be employed such as a water turbine, spiral drive or the like.

Therefore, it can be seen that with the embodiment as constructed in FIGS. 22–24, a hand-held oral cleansing and massaging unit is provided wherein the bristles 106 may be power rotated while the pick portion 111 vibrates. Simultaneously, the pair of fluid streams conducted through conduits 92 and 93 are discharged through the apertures 116 and 110 in a pulsating fashion to perform flushing and irrigating actions.

Another embodiment of the present invention is shown in FIGS. 25 and 26 that is water powered which includes a body portion 130 having an inlet water conduit 131 that is suitably connected to a source of water supply. Conduit 131 is in communication with a chamber 132, the entrance to which includes a water turbine 133 which is activated by the flow of water therepast so that the water will impinge upon the vanes of the wheel. The wheel is mounted on a shaft between housing wall 134 and an interpartition 135. Partition 135 also serves to mount a drive wheel 136 which is in mesh with a gear 137 carried on a shaft 138. An eccentric cam in the shape of an oblong member is indicated by numeral 140 and is carried on the shaft 138 so as to rotate therewith. Riding on the peripheral surface of the cam is a pivoting member 141 which is resiliently biased in contact therewith by means of spring 142. The opposite end of member 141 opposite to its end riding on the cam 140 is connected to a pivotal shaft 143 which carries a massaging element or tufts of bristles 144. The bristles 144 have terminating ends which project beyond the housing 130 through an elongated slot so as to come into contact with the gums of the user. Water is discharged in a flushing and irrigating fashion through this same slot.

Yet another embodiment of the present invention is shown in FIG. 27 which includes a body member 146 housing an electric motor 147 at one end in an encased watertight chamber and including an enlarged chamber 148 at its other end which is in fluid communication with an aperture 150 for discharging water about a rotating brush 151. Water, under pressure, is supplied to chamber 148 via an inlet conduit 149. The brush is rotated by means of a ring gear 152 forming the base thereof which rotates on an axle 153 mounted on a rotating bearing 154. Ring gear 152 is driven by double gear 155 which is carried on the extreme end of a drive shaft 156 rotatably supported on mounts 157 and 158 which project into the fluid conduit 160. The motor 147 is coupled to the end of drive shaft 156 by means of a detachable coupling 161. A pick 162 is provided which extends through the bristles of the brush 151 which is composed of rubber or like material. The brush rotates in an oscillatory manner in alternate clockwise and counterclockwise directions. Water is supplied about the pick via a port 163 formed in a hollow sleeve 164 surrounding the pick shank and ring gear supporting shank. If desired, the motor may take the form of the water-driven motor shown in connection with the embodiment of FIGS. 25 and 26.

In view of the foregoing, it can be seen that the dental cleansing and massaging apparatus of the present invention provides an advanced construction for improving personal dental hygiene. A variety of stroking, vibratory and rotary brush actions are available by the constructions of the present invention as well as vibratory pick movements for effecting the dislodgment of food particles from between the teeth and stimulation of the gums. Simultaneously, a pressurized main stream of water is discharged from the device so as to irrigate and wash the user's mouth. The apparatus may be readily coupled to a conventional water faucet so that a supply of pressurized water may be readily available to operate water turbines, if employed, and to assist the user in the dental hygienic procedure.

What is claimed is:
1. An oral hydrotherapeutic device comprising:
   an elongated hollow body having apertures formed therein adjacent the ends thereof opening transversely to the central longitudinal axis of said body;
   brush means outwardly projecting from one of said apertures and a pick outwardly projecting from the other of said apertures, said brush means comprises a vaned water turbine carried in the hollow of said body rotatably mounted thereon immediately below said associated aperture;
   a plurality of bristles secured to said turbine so as to rotate therewith in response to impingement of water on the vanes thereof; and
   means coupled to said body for supplying a pressurized mainstream of water into the hollow thereof so that the water is selectively discharged via said apertures about said brush or said pick so as to cooperatively flush away oral debris and stimulate the gums.
2. The invention as defined in claim 1 including
   a pick composed of resilient material carried on said turbine surrounded by said bristles and having a terminating end extending beyond the ends of said bristles.
3. The invention as defined in claim 1 wherein
   said bristles are secured to a round base having a plurality of apertures gormed therein adapted to discharge water therethrough;
   a fluted pick supported on said body among said bristles and projecting through an enlarged one of said apertures coaxial with said base; and
   adjustment means for supporting the end of said pick on said body adapted to regulate the speed of rotation of said bristles.

4. An oral hydrotherapeutic device comprising:
an elongated hollow body having apertures formed therein adjacent the ends thereof opening transversely to the central longitudinal axis of said body;
brush means outwardly projecting from one of said apertures and a pick outwardly projecting from the other of said apertures;
means coupled to said body for supplying a pressurized mainstream of water into the hollow thereof so that the water is selectively discharged via said apertures about said brush or said pick so as to cooperatively flush away oral debris and stimulate the gums;
said brush means includes a plurality of bristles radially carried on the end of a shaft rotatably carried by said body within the hollow thereof; and
a water actuated turbine having curved vanes on the other end of said shaft disposed in the path of water flow so as to be rotatably moved in response thereto to drive said bristles within said selected aperture.

5. An oral hydrotherapeutic device comprising:
an elongated hollow body having apertures formed therein adjacent the ends thereof opening transversely to the central longitudinal axis of said body;
brush means outwardly projecting from one of said apertures and a pick outwardly projecting from the other of said apertures;
means coupled to said body for supplying a pressurized mainstream of water into the hollow thereof so that the water is selectively discharged via said apertures about said brush or said pick so as to cooperatively flush away oral debris and stimulate the gums;
said brush means includes a plurality of spaced apart rows of bristles radially carried on the end of a shaft rotatably carried on said body within the hollow thereof; and
a continuous spiral vane carried on the length of said shaft whereby rotation of said brush means is achieved by impingement of a water stream against said spiral vane and said rows of bristles.

6. An oral hydrotherapeutic device comprising:
an oral syringe composed of a length of plastic tubular material having an integrally formed water discharge end terminating in a pick;
a coupling member adapted to be releasably secured onto the end of a water faucet; and
a flexible hose connecting said coupler to said syringe so as to be in fluid communication therewith.

7. The invention as defined in claim 6 including
an adapter member interposed between the faucet and said coupler member;
said coupler member having a tubular inner sleeve of resilient material and an outer casing composed of rippled rigid material; and
clamping means encircling said sleeve adapted to be constricted to tighten said coupler member onto the faucet.

8. The invention as defined in claim 7 wherein
said syringe discharge end is formed with an arcuate section terminating in a water discharge aperture defined by the continuous wall of said tubular syringe and wherein a portion of said wall is formed with a tapered shape constituting said pick.

9. The invention as defined in claim 7 wherein
said syringe discharge end is formed in an arcuate section terminating in a water discharge aperture defined by the continuous wall of said tubular syringe; and
said pick comprising a length of wire covered with a resilient material secured at one end to the inside surface of said wall and projecting outwardly from said discharge aperture.

10. The invention as defined in claim 9 wherein
said wire is bent to form a closed loop having both of its terminating ends secured to said tubular wall inside surface.

11. The invention as defined in claim 7 wherein
said syringe discharge end is formed in an arcuate section terminating in a water discharge aperture defined by the continuous wall of said tubular syringe; and
said pick comprising a length of tubing composed of plastic-like material secured at one end to the inside surface of said wall and projecting externally of said syringe from said discharge aperture.

12. An oral hydrotherapeutic device operable from a pressurized water source comprising:
an elongated hollow housing having an internal conduit enclosed thereby;
one end of said housing having an aperture formed therein in fluid communication with said conduit;
a brush means rotatably mounted on said housing end so that the bristles thereof extend externally of said housing through said aperture;
a drive shaft extending through said conduit and operatively coupled to said brush means to effect rotation thereof;
power means carried on the other end of said housing adapted to rotate said drive shaft for powering said brush means;
said brush mounting means includes an upright member coaxial with said first mentioned aperture and formed with a central aperture;
a vibratory pick mounted on said housing and extending vertically through said upright member aperture to terminate in a top portion composed of resilient material;
means interposed between said drive shaft and said pick for causing said pick to vibrate within its associated aperture in response to rotation of said drive shaft;
a second conduit enclosed within said housing extending in parallel to said first mentioned conduit; and
means connected to said housing for supplying the pressurized water to both of said conduits whereby the water is discharged via said first and second apertures about said brush means and said pick tip portion.

13. The invention as defined in claim 12 including
magnetic coupling means operable to connect said power means to said drive shaft.

14. The invention as defined in claim 12 including
a vane carried on said drive shaft adapted to alternately interrupt the introduction of water to said pair of conduits so as to produce a pulsating discharge through said apertures.

15. The invention as defined in claim 12 wherein
said vibrating means includes an irregular cam carried on the end of said drive shaft and a cam follower carried on said pick; and
resilient means coupled between said housing and said cam follower to normally bias said cam follower into sliding engagement with said cam.

16. An oral hydrotherapeutic device operable from a pressurized water source comprising:
an elongated hollow housing having an internal conduit enclosed thereby;
one end of said housing having an aperture formed therein in fluid communication with said conduit;
a brush means rotatably mounted on said housing end so that the bristles thereof extend externally of said housing through said aperture;
a drive shaft extending through said conduit and operatively coupled to said brush means to effect rotation thereof;
power means carried on the other end of said housing adapted to rotate said drive shaft for powering said brush means;
said brush means is connected to said drive shaft via a ring and pinion gear arrangement; and a pick carried on said ring gear surrounded by said brush means.

17. An oral hydrotherapeutic device operable from a pressurized water source comprising:
- an elongated hollow housing having an internal conduit enclosed thereby;
- one end of said housing having an aperture formed therein in fluid communication with said conduit;
- a brush means rotatably mounted on said housing end so that the bristles thereof extend externally of said housing through said aperture;
- a drive shaft extending through said conduit and operatively coupled to said brush means to effect rotation thereof;
- power means carried on the other end of said housing adapted to rotate said drive shaft for powering said brush means; and
- said power means comprises a vaned water turbine and further includes means interconnecting said drive shaft with said turbine for rotating said brush means in a back and forth movement.

18. The invention as defined in claim 17 wherein said interconnecting means includes a rotatable elliptical cam operatively driven by said turbine and a resiliently biased cam follower carried on said drive shaft in sliding contact with said cam; and
- said brush means carried on the end of said drive shaft adapted to move in said back and forth movement in response to rotation of said cam.

References Cited

UNITED STATES PATENTS

| 719,017 | 1/1903 | Lenhardtson | 132—89 |
| 2,285,865 | 6/1942 | Lowe et al. | 15—24 |
| 2,841,806 | 7/1958 | Blasi | 15—24 |

FOREIGN PATENTS

| 512,380 | 1/1955 | Italy. |
| 43,057 | 10/1915 | Sweden. |

L. W. TRAPP, Primary Examiner

U.S. Cl. X.R.

15—24